3,300,360
PROCESS FOR THE MANUFACTURE OF CORRUGATED BOARD
Robert H. Williams, New Brunswick, and Lawrence J. Hickey, Livingston, N.J., assignors to National Starch and Chemical Corporation, New York, N.Y., a corporation of Delaware
No Drawing. Filed Oct. 21, 1963, Ser. No. 317,787
4 Claims. (Cl. 156—292)

This invention relates to an improved process for use in the manufacture of corrugated board as well as to the novel adhesives utilized in said process.

It is the prime object of this invention to provide an improved process for preparing corrugated board, said process resulting in the production of flat, warp-free corrugated board. An additional object is to provide a highly efficient process which requires substantially less equipment and floor space than the methods heretofore used. It is our further object to utilize novel, quick setting adhesive for the preparation of the corrugated board, said adhesives having relatively low water content and which are applied to the board while hot so as to set on cooling as opposed to presently utilized corrugating adhesives which are essentially aqueous systems with low solids contents and which are dependent upon the application of heat in order to form a bond. A still further object of our invention involves the preparation of heavy as well as light weight corrugated board at machine speeds which exceed those attainable with present techniques. Various other objects and advantages of our invention will be apparent from the following description thereof.

In the production of corrugated board, the procedure normally employed involves a continuous process wherein a strip of paperboard is first corrugated by means of heated, fluted rolls. An adhesive is applied to the protruding tips on one side of this corrugated strip and a flat sheet of paperboard, referred to as a liner, is then brought into contact with these tips and, by the application of heat and pressure, a bond is subsequently formed. The product thus prepared is known as a single faced board inasmuch as it has a liner on only one surface thereof. However, by repeating the above described bonding process on the exposed side of the corrugated strip of the single faced board, there is then produced a so-called double faced board comprising an inner corrugated layer sandwiched between two liners.

This procedure presents the practitioner with a rather difficult adhesive problem, as there is a decided limit to the amount of pressure which can be applied to form the bond between the tips of the corrugated strip and the flat outer layers, or liners.

Obviously, the application of too great or prolonged pressure would result in the crushing of the corrugation. In overcoming this problem, the practitioner has in the past resorted to the use of adhesives which require only brief contact with the heating elements of the corrugating apparatus in order to undergo the high viscosity increase needed to form a strong and lasting bond. This viscosity increase must occur with great rapidity since the high speed at which the board is produced will not allow for any prolonged heating operation.

Originally, aqueous solutions of silicate of soda having solids contents of about 35%, by weight, were use as adhesives for preparing corrugated board; this reagent forming a bond by rapidly increasing in viscosity when a small amount of water is evaporated therefrom upon the application of heat. Its use, however, did involve certain disadvantages including its high alkalinity, its tendency to discolor certain articles, and the extremely brittle nature of its set films which often cracked when the board was bent. These disadvantages led, in turn, to the use of starch formulations which consisted of an adhesive portion of raw, ungelatinized starch suspended in a viscous carrier which was usually an aqueous dispersion of cooked starch having a total solids content in the order of about 20%, by weight. In these compositions, the raw starch is considered the adhesive component since, upon application of heat for periods of from about 0.1 to 10 seconds, it gelatinizes to produce the requisite viscosity increase which, in turn, makes possible the adhesive bond. The aqueous carrier portion, on the other hand, serves primarily to delivery the uncooked starch to the interface where the in situ gelatinization and adhesion is to take place.

Thus, it is seen that the above described adhesive formulations, which are essentially low solids, aqueous systems, are dependent upon the loss of water from silicate of soda or upon the in situ gelatinization of raw starch granules. Both systems thus require the absorption, by the board of high concentrations of water as well as the application of heat, thereto, in order to form a bond. These requirements, in turn, lead to a number of rather serious disadvantages. Of most concern, and particularly with respect to the preparation of double faced board, has been the need for a relatively prolonged drying and conditioning program to which the freshly bonded boards have to be subjected so as to prevent the warping which would otherwise occur within several minutes after the boards have been bonded. Warping is, of course, caused by moisture or, more particularly, by changes in the moisture content of one layer of a bonded assembly with accompanying changes in its dimensions. Thus, the predisposition towards warping, on the part of the freshly bonded boards, results from the fact that during the bonding process heat as well as excessive amounts of moisture would ordinarily be applied to only one surface, or liner, of the double faced board. On cooling, there would therefore be an unequal rate of expansion and/or contraction between the two liner boards inasmuch as their moisture contents differ appreciably. Needless to say, this unequal rate of expansion and/or contraction is aggravated by the fact that a large amount of heat has also been applied to the liner board possessing the greater amount of moisture. As a result, the freshly bonded boards have to be dried, or at least have their moisture contents evenly distributed. This is accomplished by stacking the boards in a special arrangement which is designed to counteract their natural tendency towards warping.

In these drying stacks, groups of about 10 to 12 boards are arranged so that within each group the respective boards each have their dry liners in contact with the moist liner of the adjacent board. These groups of boards are then stacked, one atop the other, so that the concave surfaces of any two adjacent groups of boards are placed in direct opposition to one another so as to thereby effect their ultimate flattening. As might well be imagined, this drying and conditioning program necessitates the utilization of a considerable amount of storage space in the corrugating plant and requires the expenditure of costly manual labor for the stacking and unloading of the boards as well as for their movement to and from the storage areas. Over-all production rates are also decreased since the freshly bonded boards lack the necessary stiffness and cannot, of course, be subjected to the remaining printing and converting operations prior to the completion of their conditioning. Thus, for example, any attempts to print upon a warped board would cause it to be crushed. Moreover, much of the automatic converting apparatus which is now used in the corrugating industry is rendered inoperable when warped board is being handled.

Still another disadvantage resulting, in this case, from the need for heat on the part of the presently utilized corrugating processes is the fact that they require the installation of expensive and space consuming equipment such as the large boilers required for the generation of steam, the pre-heaters for the liner boards, and the large hot plate sections which apply the heat which effects the in situ setting of the silicate of soda or starch adhesives. The initial purchase and subsequent upkeep of this equipment represents a great investment in both capital and labor.

A further undesirable feature of the prior art corrugating adhesives, resulting from their high water content and their need for the application of heat at the point of bonding, is the fact that the over-all machine speeds which can be achieved under these conditions, particularly when producing heavy weight boards, are somewhat below those which the practitioner would desire. Thus, although other phases of the corrugated board manufacturing process proceed at fairly rapid rates, the machine speed which prevails at the point wherein bonding occurs must, of necessity, be reduced so as to permit the attainment of the high temperatures required to drive water from the silicate of soda or to effect the in situ gelatinization of the raw starch granules. As noted above, this problem of low machine speeds is of special concern with respect to the preparation of heavy weight board wherein the liners would, of course, be somewhat thicker and denser and therefore require more time to heat.

From the above discussion, it can be readily surmised that the techniques and adhesives which are now employed for the production of corrugated board leave much to be desired from the point of view of efficiency and economy and also, of course, with respect to the quality of the resulting boards.

We have now discovered that the preparation of corrugated board by an improved technique which utilizes novel adhesive systems provides boards which are perfectly flat and devoid of any tendency towards warping. In addition, our novel process, in comparison with prior art techniques, operates with vastly increased efficiency with greater economy and at higher machine speeds. Moreover, the boards resulting from the process of our invention have been found, surprisingly, to be considerably stronger than the boards prepared by means of prior art processes.

In brief, the improved process of our invention comprises the bonding of the fluted, corrugated strip to one or both of the liners, i.e. the outer faces of the board, by a bonding technique wherein the adhesive utilized is a high solids dispersion of relatively low water content. The latter dispersion is applied, while hot, to the protruding tips on one or both of the surfaces of the corrugated strip, whereupon one or both of the liners is then applied to the thus coated tips of the corrugated strip. The adhesive has the property of setting immediately upon cooling, thereby forming the desired bond, without any application of heat being necessary. This technique is, of course, diametrically opposed to the procedure necessitated by the use of silicate of soda or by the starch adhesives which are gelatinized in situ, wherein the adhesive is essentially an aqueous system of low adhesive solids content which is applied while relatively cool and wherein the application of heat must accompany the setting.

There are, of course, many advantages resulting from the fact that the process of our invention effects the bonding of corrugated board without the need for applying large amounts of water to the board or for any heat being applied in order to set the adhesive. First and foremost, it may be noted that this technique results in the preparation of completely flat, warp-free board and therefore makes possible the complete elimination of the time and space consuming drying and conditioning operations to which the corrugated board prepared by the use of the prior art methods must be subjected. The drying and conditioning of the finished boards is no longer required since, by utilizing a bonding method wherein there is only a minimal amount of water and no heat being applied to the board during the actual bonding of the latter except for the heat present in the adhesive, the problem of warping has, in effect, been obviated. As a result, it is now possible for the practitioner to make full use of the valuable floor space which had previously been occupied by the drying boards. Moreover, the absence of the time lag necessitated by the storage of the boards allows for the use of automatic equipment which can stack and unload the boards as well as convey them directly from the production line to the remaining printing and converting operations, thereby speeding up the entire manufacturing process as well as also eliminating the costly manual handling operations necessitated by the movement of the boards to and from the storage areas.

Of equal significance is the absence, in our novel process, of any heat requirements other than for the heat which is utilized for the formation of the fluted strip. Thus, it is now possible for the practitioner to operate his corrugating apparatus with a considerable reduction in the number of the large scale boilers, the pre-heaters for the liners, or the hot plates required by the prior art techniques. As a result, a considerable saving of both space and capital investment is thereby effected.

Finally, it may be noted that our novel process makes possible the attainment of faster machine speeds for heavy as well as light weight boards. These increased machine speeds are made possible by the fact that there is no longer any need for the expensive and time consuming application of heat at the point of bonding, a step which was heretofore necessary when using high water content adhesives requiring the loss of substantial amounts of water; the delay, as noted earlier being even greater in the case of heavy weight boards.

As for the adhesives which are applicable for use in our novel corrugating process, these may be described as starch products capable of forming aqueous dispersions, i.e. colloidal sols, having a total solids content of at least 35%, by weight, which at temperatures of about 180° F. have a viscosity of at least about 100 and no more than about 600 centipoises and which when cooled to a temperature of about 100° F. will then have a viscosity of at least about 300 centipoises.

The starch products which fulfill the above described specifications are utilized in the process of our invention in the form of hot, aqueous dispersions having exceedingly high solids content in the order of about 32 to 60%, by weight. These dispersions may, however, have a total solids content, i.e. starch solids plus extraneous fillers and additives, which will be in the order of about 35 to 60%, by weight. Under such conditions, these adhesives are, in effect, equivalent to molten solids which need only to be cooled in order to effect their more or less immediate bonding.

As used herein, the term "starch products" is meant to encompass amylaceous substances such as native starch as well as dextrinized, hydrolized, oxidized, esterified, and etherified starches still retaining their substantially amylaceous characteristics and whose granule structure may be either intact or in disrupted form. These starch products may be derived from any sources including corn, wheat, potato, tapioca, waxy maize, waxy sorghum, sago, rice or sweet potato, etc.

Of particular interest for use in the process of our invention are white, corn dextrins having a solubility in water, at about 77° F., of from about 5 to 15%, by weight; a reducing sugar content of from about 1 to 3.5%, by weight; and, an Anhydrous Fluidity Value, herein-after referred to as the ABF value, of between about 3.8 to 4.2. (The ABF value is defined as the ratio of the amount of water to the amount of dextrin when the latter is cooked for 5 minutes at 195° F. with 15% of borax on the weight of the dextrin, so as to provide a dispersion having a viscosity, when cooled to 77° F., of 70 centipoises.) Although dextrins having solubility, reducing sugar and ABF values which are outside of these suggested limits may be operable in the process of our invention, it will be found that the use of dextrins which comply with these standards will effect optimum results.

It is interesting to note that at various times the use of dextrin based adhesives for the bonding of corrugated board has, in fact, been considered. However, these attempts have always involved dextrins having ordinary viscosity characteristics which were used in the form of aqueous dispersions having low total solids contents which were in the order of about 25 to 35%, by weight. Unfortunately, these dextrin based corrugated adhesives proved to be unsuccessful since, when heated, they tended to rapidly thin out and they thus set too slowly to adhere the board before the latter had reached the end of the machine. In contrast, the adhesive formulations of our novel process possess a viscosity:solids content relationship such that they may be applied only at elevated temperatures.

In preparing our adhesive formulations, the selected starch product is ordinarily dispersed in cold water which is then heated to a temperature of about 180 to 200° F. so as to thereby form a dispersion having a total solids content which, as noted earlier, will be in the order of from about 35 to 65%, by weight. In order to further improve, i.e. accelerate, the quick setting properties of these formulations, the practitioner may, if desired, introduce borax in a concentration of about 5 to 20%, or sodium hydroxide in a concentration of about 1 to 5%, the latter concentrations being based upon the weight of the starch product solids which are present in the dispersion. In any event, it is necessary that the resulting formulation be maintained at a temperature in the range of about 170 to 205° F. prior to its application to the protruding tips of the corrugated strip.

The use of our novel bonding process does not necessitate any changes in the equipment which is presently employed for the preparation of corrugated board other than to eliminate the need for the heating system, i.e. the boilers, pre-heaters for the liners, and the hot plates, etc. which is now required for the purpose of effecting the setting of the prior art adhesives.

Thus, the actual application of our adhesives to the protruding tips of the corrugated strip may be accomplished by the use of the glue rollers which are ordinarily employed in most corrugating machines or one may, if desired, utilize other application methods which may be able to achieve a more economical distribution of adhesive. Following the application of the adhesive to the protruding tips of the corrugated strip, the latter may then be brought into immediate contact with the liner board. There is, of course, no need for any pre-heating of the latter since bonding will take place merely upon the cooling of the adhesive to a temperature in the range of about 90 to 130° F. The cooling of the adhesive thereby serves to cause its instantaneous setting as a result of the substantial viscosity increase that takes place. Thus, it is necessary only to bring the liner board into intimate contact with the adhesive coated corrugated strip by applying the requisite amount of pressure. In fact, it may be noted that the process of our invention will effect a bond between the corrugated strip and the liner within a period of about 0.1 to 1.0 second with still faster bonding speeds being attainable by the use of cold plates which may be brought into contact with the liner so as to accelerate the cooling and consequent setting of the adhesives.

Our process may be used for the preparation of single faced board, i.e. corrugated board having a liner on only one surface; or, for the preparation of double faced board, i.e. corrugated board having a liner on both surfaces. Moreover, our process may be used in combination with any of the bonding processes and adhesives of the prior art. Thus, for example, one may apply the first face to the board using an in situ gelatinized starch adhesive utilizing the conventional "single facer" apparatus whereupon the second liner may then be applied by means of the process of our invention utilizing the conventional "double backer" apparatus. The latter technique will be of special interest to the practitioner since, as is well known in the art, there are many problems involved in the application of the second liner board by means of the bonding techniques hitherto employed, whereas the application of the first face is a relatively less complex operation.

One rather surprising characteristic which has been noted in the boards prepared by means of the process of our invention, is that they are considerably stronger than the boards bonded by means of the prior art techniques. This enhanced strength, which probably results from the fact that our novel process is not dependent upon the application of heat, is especially evident when cartons prepared from these boards are subjected to "top-to-bottom" and "end-to-end" compression tests.

The following examples will further illustrate the embodiment of our invention. In these examples, all parts given are by weight unless otherwise noted.

*Example I*

This example illustrates the use of the novel process and adhesives of our invention for the preparation of both single and double faced corrugated board.

An adhesive composition comprising 100 parts of water; 10 parts of borax; and, 100 parts of a white, corn dextrin having a solubility in water, at 77° F., of 11%, a reducing sugar content of 2.4%, by weight, and an ABF value of 4.03, was prepared by adding the dextrin and borax to the water and, with agitation, effecting the dispersion of the dextrin by heating the resulting mixture, which had a total solids content of 39%, to a temperature of 180° F. The thus prepared dispersion had a viscosity of 480 centipoise at 180° F. (It may be noted that on cooling a sample of this dispersion to a temperature of 100° F., it was found to have a viscosity of 900 centipoise.)

While maintaining the temperature of this adhesive at 180° F., it was divided into two batches which were used, respectively, for the preparation of both single and double faced board by means of the novel process of our invention, as described hereinabove. Thus, the preparation of the single faced board was conducted using a conventional single facer with hot rolls for the preparation of the fluted strip while a conventional double backer with cold plates for the acceleration of the bonding process was used for the preparation of the double faced board. Both the single faced and double faced boards were produced, with excellent bonds, at machine speeds of 350 feet per minute.

*Example II*

This example illustrates the attempted use, in the corrugating process of our invention, of an adhesive composition whose total solids content is less than our stated minimum limit and whose viscosity at 180° F. is, as a result, far below the required operating limit. The base for this adhesive was an ordinary dextrin, having high water solubility, of the type commonly utilized for such applications as case sealing adhesives. Of interest is the fact that the A.B.F. value of this dextrin was less than our preferred minimum for this value and that it had a degree of water solubility which far exceeded our preferred maximum limit.

This adhesive, which comprised 100 parts of water; 5 parts of borax; and, 50 parts of a white corn dextrin having a solubility in water, at 77° F., of 55% by weight, a reducing sugar content of 2.9%, and an A.B.F. value of 2.84, was prepared by adding the dextrin and borax to the water and, with agitation, effecting the dispersion of the dextrin by heating the resulting mixture, which had a total solids content of only 32.4% to a temperature of 180° F. At the latter temperature the thus prepared dispersion had a viscosity of only 30 centipoise. (It may be noted that on cooling a sample of this dispersion to a temperature of 100° F., it was found to have a viscosity of 325 centipoise.)

While maintaining the temperature of this adhesive composition at 180° F., it was used for the adhesion of the second liner board to a single faced board, by means of the novel process of our invention, as described hereinabove, utilizing the double backer with cold plates. Under these conditions, it was found that a rather low machine speed of less than 100 feet per minute was required in order to effect a bond which would hold the board together. However, even at this low operating speed it was found that the resulting bond was undesirably soft and mushy and, as a result, the edges of the board displayed a tendency to delaminate.

An attempt was made to run this adhesive at higher machine speeds by heating the plates to about 200° F. Although the resulting bond was dryer and harder, it was, nonetheless, a superficial "zipper" type bond which was readily delaminated. Evidently, under these conditions the adhesive had been driven into the substrate to such an extent that it could not longer effect a satisfactory bond.

The above described results serve to emphasize the criticality of the viscosity and solids content criteria which we have established for those adhesives applicable for use in our novel corrugating process.

*Example III*

This example illustrates the use in the corrugating process of our invention of an adhesive composition based on a dextrin having a satisfactory viscosity:solids content relationship but whose solubility and A.B.F. values lie outside of our preferred limits for these characteristics.

This adhesive, which comprised 100 parts of water; 7 parts of borax; and, 70 parts of a white corn dextrin having a solubility in water, at 77° F., of less than 5%, by weight, a reducing sugar content of 0.7%, and an A.B.F. value of 5.83, was prepared by adding the dextrin and borax to the water and, with agitation, effecting the dispersion of the dextrin by heating the resulting mixture, which had a total solids content of 35.4%, to a temperature of 180° F. At the latter temperature, the thus prepared dispersion was found to have a viscosity of 570 centipoise. (It may be noted that on cooling a sample of this dispersion to a temperature of 100° F., it was found to have a viscosity of 865 centipoise.)

While maintaining the temperature of this adhesive composition at 180° F., it was used for the adhesion of the second liner board to a single faced board made by the novel process of our invention, as described hereinabove, utilizing the double backer with cold plates. Under these conditions, it was found that a satisfactory bond was obtained at a machine speed of 270 feet per minute.

The above results indicate that although the performance achieved with the above described dextrin was adequate, in comparison the dextrin of Example I, having A.B.F. and solubility values within our preferred limits, permitted the use of the far more rapid machine speed of 350 feet per minute.

Summarizing, our invention is thus seen to provide the practitioner with novel adhesive compositions for use in an improved process for preparing corrugated board. Variations may be made in proportions, procedures and materials without departing from the scope of this invention which is limited only by the following claims.

We claim:
1. In the process of preparing corrugated paperboard by adhesively bonding at least one liner to the tips of the corrugations of a corrugated paper strip, the steps which comprise applying, at an elevated temperature to the protruding tips on at least one surface of said corrugated paper strip, an adhesive comprising a hot aqueous high solids dispersion of a starch product, said hot aqueous dispersion when applied being at an elevated temperature of at least about 170° F.; said starch solids being in a major proportion of the total solids in said dispersion being in the order of from about 32% to 60% by weight of the dispersion; said dispersion having a total solids content of at least 35%, by weight; a viscosity, when measured at about 180° F., of at least about 100 centipoises; and a viscosity, when cooled to about 100° F., of at least about 300 centipoises; and applying at least one liner to the adhesive coated tips of said corrugated strip, the adhesive bond between said liner and said corrugated strip being formed during the cooling of said adhesive from its elevated temperature.

2. The process of claim 1, wherein the aqueous dispersion of said starch product contains, in a minor proportion of the total solids in said dispersion, a reagent capable of accelerating the quick setting properties of said adhesive, the reagent being selected from the group consisting of borax and sodium hydroxide; said borax, when present, being employed in a concentration of about 5 to 20% and said sodium hydroxide, when present, being employed in a concentration of about 1 to 5%; the latter concentrations being based upon the weight of the starch product solids which are present in the dispersion.

3. In the process of preparing corrugated paperboard by adhesively bonding at least one liner to the tips of the corrugations of a corrugated paper strip, the steps which comprise applying, at an elevated temperature to the protruding tips on at least one surface of said corrugated paper strip, an adhesive comprising a hot aqueous high solids dispersion of a white, corn dextrin having a solubility in water, at about 77° F., of from about 5 to 15%, by weight, a reducing sugar content of from about 1.0 to 3.5%, by weight, and an Anhydrous Fluidity Value of between about 3.8 to 4.2; said hot aqueous dispersion when applied being at an elevated temperature of at least about 170° F.; said dextrin solids being in a major proportion of the total solids in said dispersion being in the order of from about 32 to 60% by weight of the dispersion; said dispersion having a total solids content of at least 35%, by weight; a viscosity, when measured at about 180° F., of at least about 100 centipoises, and a viscosity, when cooled to about 100° F., of at least about 300 centipoises; and, applying at least one liner to the adhesive coated tips of said corrugated strip, the adhesive bond between said liner and said corrugated strip being formed during the cooling of said adhesive from its elevated temperature.

4. The process of claim 3, wherein the aqueous dispersion of said dextrin contains, in a minor proportion of the total solids in said dispersion, a reagent capable of accelerating the quick setting properties of said adhesive, the reagent being selected from the group consisting of borax and sodium hydroxide; said borax, when present, being employed in a concentration of about 5 to 20% and said sodium hydroxide, when present, being employed in a concentration of about 1 to 5%; the latter concentrations being based upon the weight of the starch product solids which are present in the dispersion.

References Cited by the Examiner

UNITED STATES PATENTS

| | | | |
|---|---|---|---|
| 2,274,789 | 3/1942 | Horesi | 127—38 |
| 2,303,791 | 12/1942 | Davidson et al. | 106—210 |
| 2,346,644 | 4/1944 | Bauer et al. | 106—213 |
| 2,610,136 | 9/1952 | Casey et al. | 106—213 |

ALEXANDER H. BRODMERKEL, *Primary Examiner.*

L. B. HAYES, *Assistant Examiner.*